US 008588522B2

(12) United States Patent
Bhatti et al.

(10) Patent No.: US 8,588,522 B2
(45) Date of Patent: Nov. 19, 2013

(54) METHOD AND SYSTEM FOR DYNAMIC COLOR CORRECTION

(75) Inventors: Nina Bhatti, Los Altos, CA (US); Melanie M. Gottwals, San Jose, CA (US); Nathan Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 13/085,908

(22) Filed: Apr. 13, 2011

(65) Prior Publication Data
US 2012/0263379 A1 Oct. 18, 2012

(51) Int. Cl.
*G06K 9/00* (2006.01)
(52) U.S. Cl.
USPC .......................................................... 382/167
(58) Field of Classification Search
USPC .......................................................... 382/167
See application file for complete search history.

(56) References Cited

U.S. PATENT DOCUMENTS

| | | | | |
|---|---|---|---|---|
| 5,649,072 A * | 7/1997 | Balasubramanian | .......... | 358/1.9 |
| 5,852,675 A * | 12/1998 | Matsuo et al. | ................. | 382/167 |
| 6,328,567 B1 * | 12/2001 | Morris et al. | ................. | 433/215 |
| 6,873,727 B2 * | 3/2005 | Lopez et al. | ................. | 382/162 |
| 7,006,690 B1 | 2/2006 | Imura | | |
| 7,020,331 B2 * | 3/2006 | Saikawa et al. | ............... | 382/167 |
| 7,251,362 B2 * | 7/2007 | Osawa et al. | ................. | 382/167 |
| 7,414,758 B2 * | 8/2008 | Vaughn | ........................ | 358/474 |
| 7,840,065 B2 | 11/2010 | Pearson et al. | | |
| 8,009,884 B2 * | 8/2011 | Chio | .............................. | 382/128 |
| 8,044,969 B2 * | 10/2011 | Osorio et al. | ................. | 345/604 |
| 8,179,576 B2 * | 5/2012 | Hayashi | ........................ | 358/520 |
| 8,274,696 B2 * | 9/2012 | Yoneda | ........................ | 358/1.9 |
| 8,369,625 B2 * | 2/2013 | Kim et al. | ..................... | 382/224 |
| 2002/0048400 A1 * | 4/2002 | Leedham et al. | ............. | 382/167 |
| 2004/0135790 A1 * | 7/2004 | Moore | ........................ | 345/589 |
| 2006/0159337 A1 | 7/2006 | Pearson et al. | | |
| 2007/0018906 A1 | 1/2007 | Visnovsky et al. | | |
| 2008/0007749 A1 * | 1/2008 | Woolfe | ........................ | 358/1.9 |

FOREIGN PATENT DOCUMENTS

| | | | |
|---|---|---|---|
| JP | 2000346707 A | 12/2000 | |
| JP | 2002269555 A | 9/2002 | |
| JP | 2003065852 A | 3/2003 | |
| JP | 2006064458 A | 3/2006 | |

OTHER PUBLICATIONS

Jackowski, M., et al, Correcting the Geometry and Color of Digital Images, Oct. 1997, IEEE Transactions on Pattern Analysis and Machine Intelligence, vol. 18, pp. 1-7.*

(Continued)

*Primary Examiner* — Utpal Shah
(74) *Attorney, Agent, or Firm* — Romiwa C. Akpala

(57) ABSTRACT

Embodiments of the present invention disclose a system and method for dynamic color correction of an imaged object. According to one embodiment, an image containing an object and color chart is received. The color chart includes a range of color values, while at least one feature and an associated correctable color value is determined from the imaged object. Furthermore, a target color value substantially corresponding to the correctable color value is identified. Based on the identified target color value, the correctable color value associated with the feature is then corrected.

17 Claims, 6 Drawing Sheets

(56) References Cited

OTHER PUBLICATIONS

"A World of Color Revealed on iPhone: Benjamin Moore Develops App to Digitally Match Colors," Montvale, NJ—May 2009 downloaded from http://www.designspongeonline.com/2009/06/iphone-paint-apps.html on Sep. 20, 2010.*

Color correction of uncalibrated images for the classification of human skin color Marguier, Joanna; Bhatti, Nina; Baker, Harlyn; Harville, Michael; Süsstrunk, Sabine, Nov. 5-9, 2007, p. 331-335.*

* cited by examiner

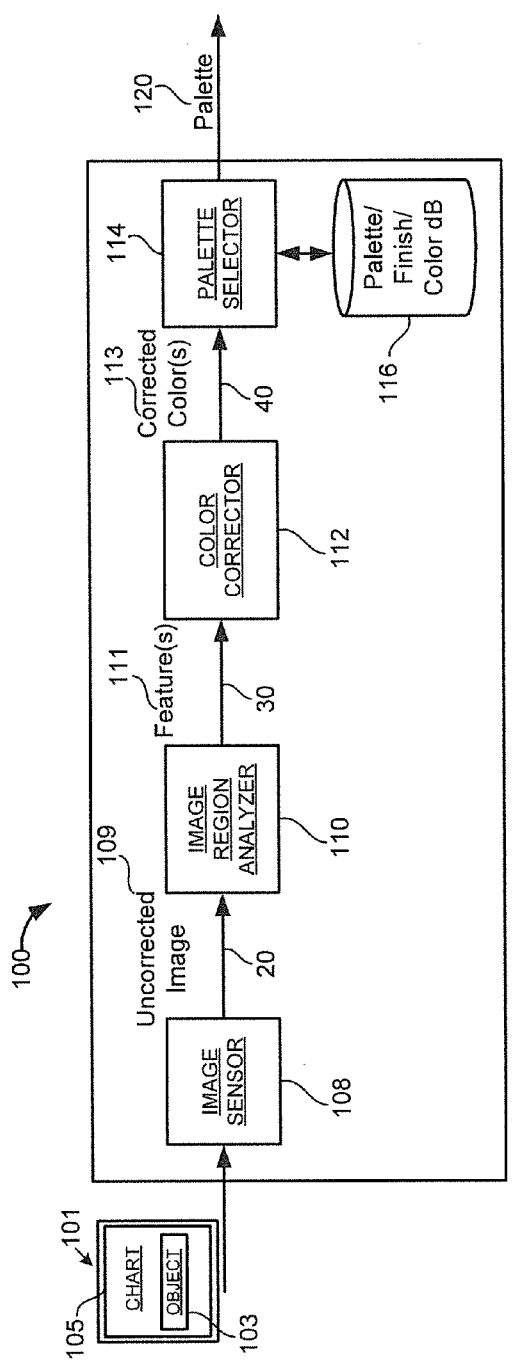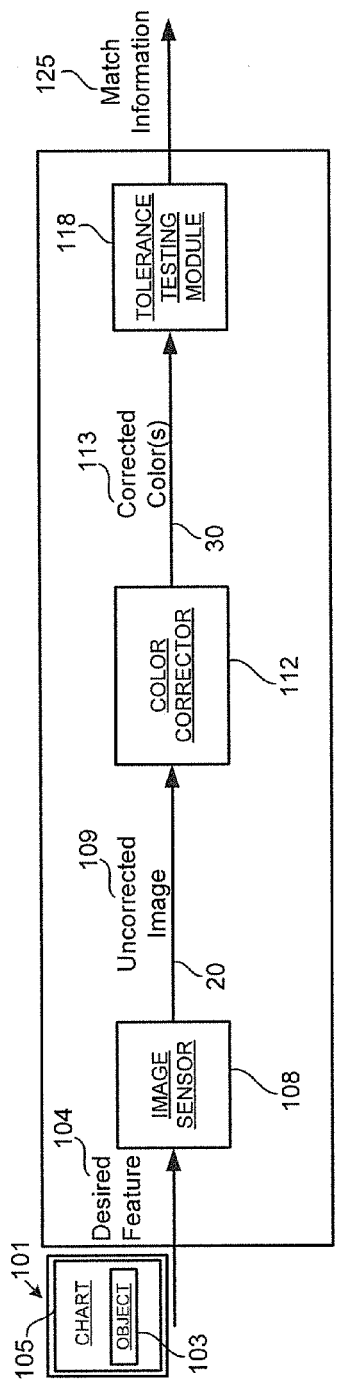

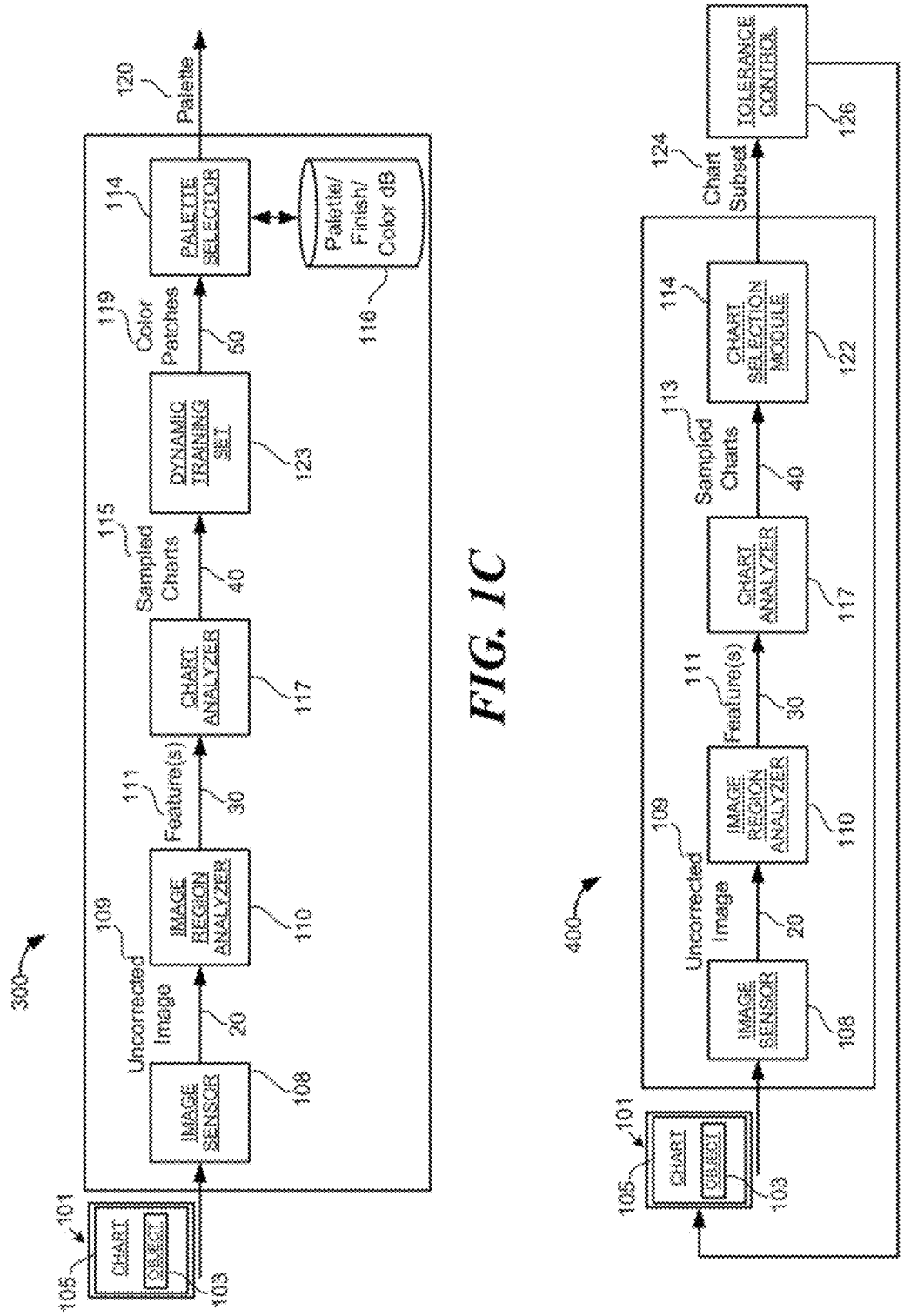

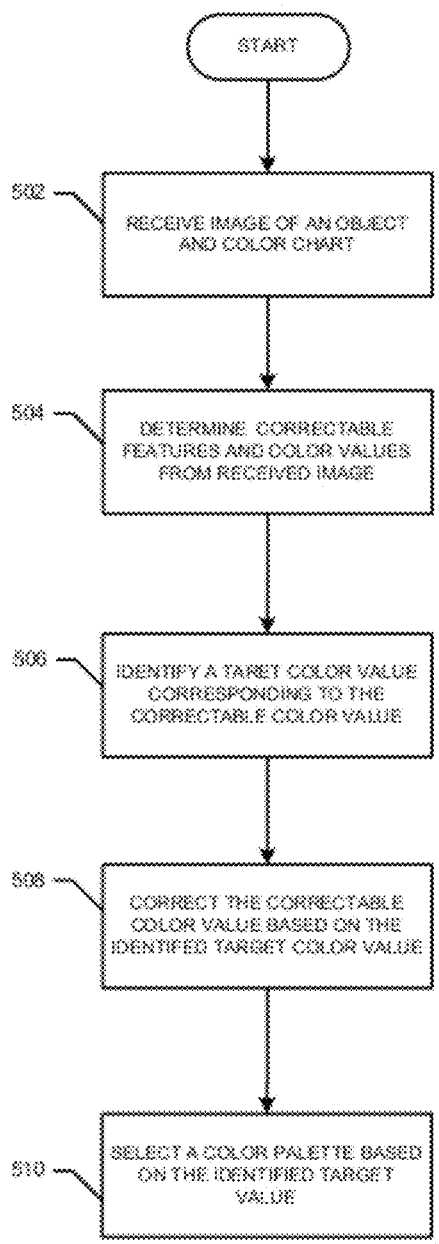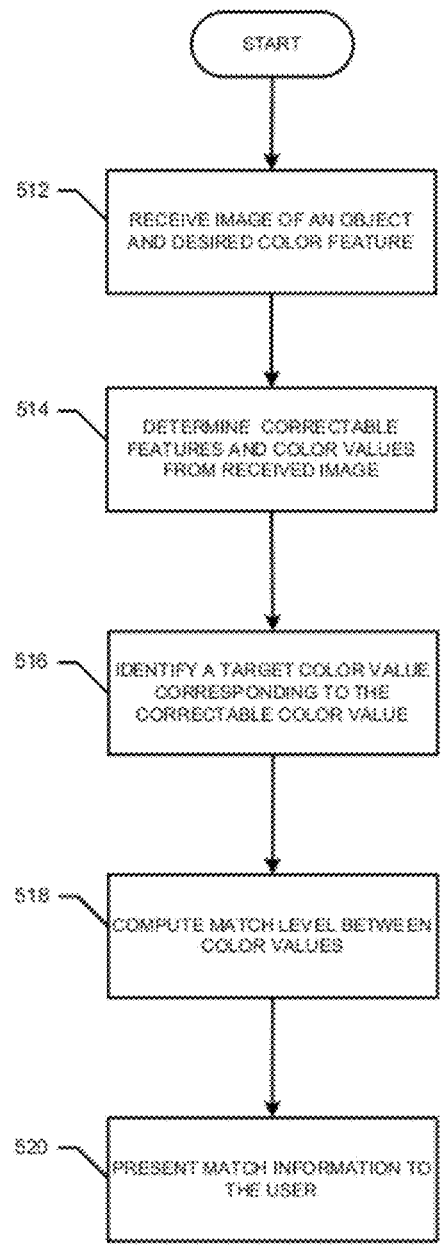
*FIG. 5A*  *FIG. 5B*

METHOD AND SYSTEM FOR DYNAMIC COLOR CORRECTION

BACKGROUND

Digital photography and the digital cameras used to capture the photographic images are omnipresent in today's society. As technology evolves, digital cameras are now consistently implemented in other portable electronic devices including cell phones, portable computers, and similar devices. Consequently, more people are utilizing their digital cameras for additional tasks and activities.

For example, people are now using digital camera technology while at home or shopping in an attempt to match colors or textures of objects at home or in a store with different finishes, paint, or apparel. However, limitations of the camera or lighting may produce inaccurate object colors and therefore inaccurate color sensing. Furthermore, people often have difficulty remembering colors, so in situ measurement of object color can assist in home or office interior or exterior decoration or in selecting apparel and other items that require color accuracy and judgment.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 1A-1D are conceptual block diagrams of the dynamic color correction system, dynamic matching apparatus, dynamic training apparatus, and chart analyzing apparatus respectively, according to an example of the present invention.

FIGS. 5A and 5B are simplified flow charts of the processing steps for dynamic color correction according to an example of the present invention.

DETAILED DESCRIPTION OF THE INVENTION

Figure 2:
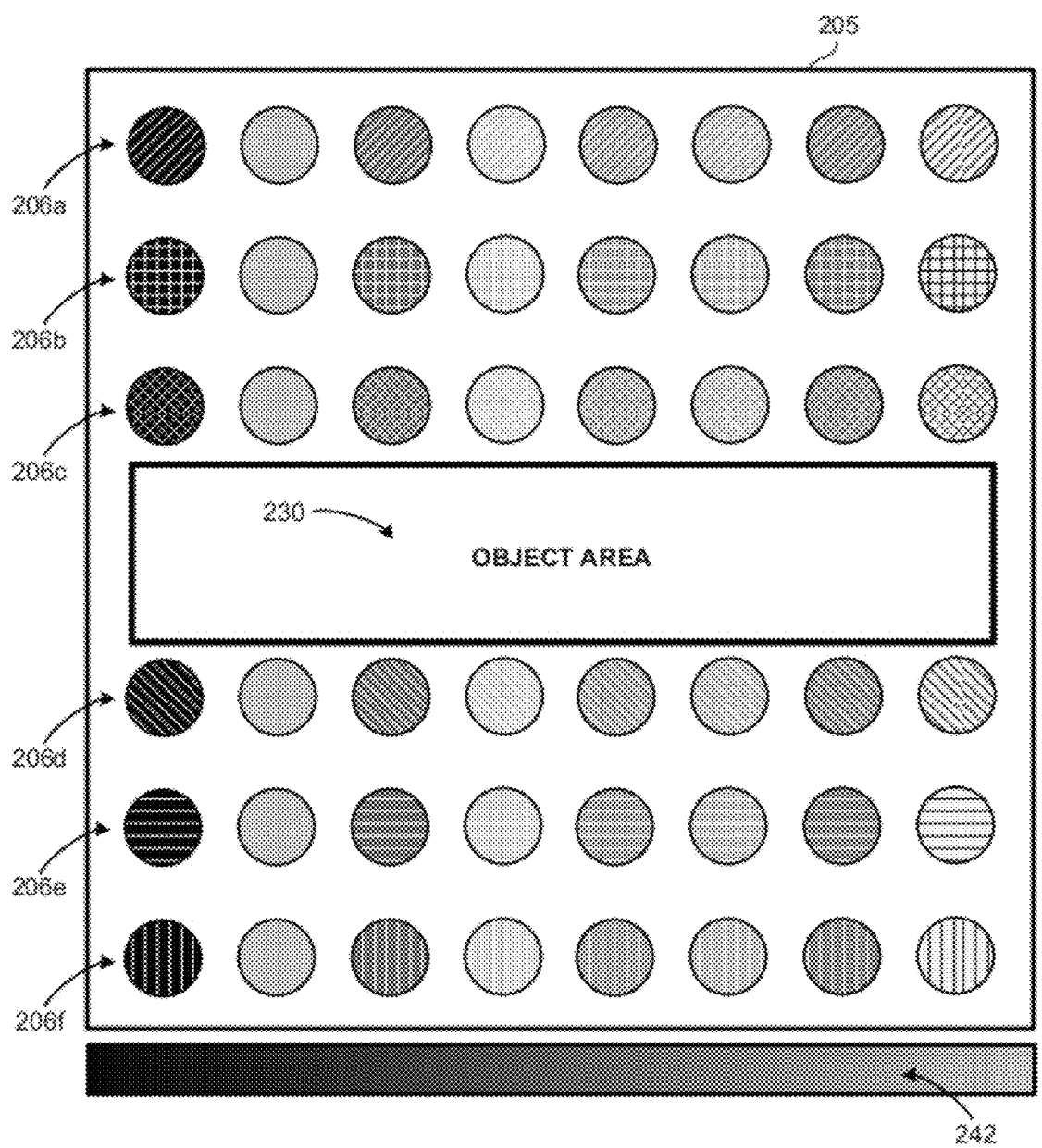
FIG. 2 is a conceptual illustration of the dynamic color chart according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Currently, most photographed images contain completely uncalibrated colors. Prior color matching systems typically aren't capable of adequate calibration, with most system unable to provide accurate values. Some color match cosmetics applications use a chart system for color matching, but their method only applies for skin tones, which have a very narrow color range. Yet another chart-based color correction system—used primarily for home décor—utilizes multiple color charts, approximately ten, one for each color range (e.g., blues greens, yellows, oranges, etc.). In this solution, the user is expected to select the correct chart and the system performs color correction based on the selected color chart. As a result, a number of problematic issues may arise: 1) manual user selection of the correct color chart requires time and effort, thereby making the system less user-friendly; 2) management of the physical collection of charts is unwieldy; 3) each chart tends to be pulled towards a center of gravity, or a center point in color space to which each object is color-corrected, such that when an object is at the edge of the color correction range of the color chart the correction is unreliable; and 4) color-challenged consumers may lack the requisite color judgment to select an appropriate chart for correction, ultimately leading to selection of the wrong color chart thus causing poor results.

Figure 3:
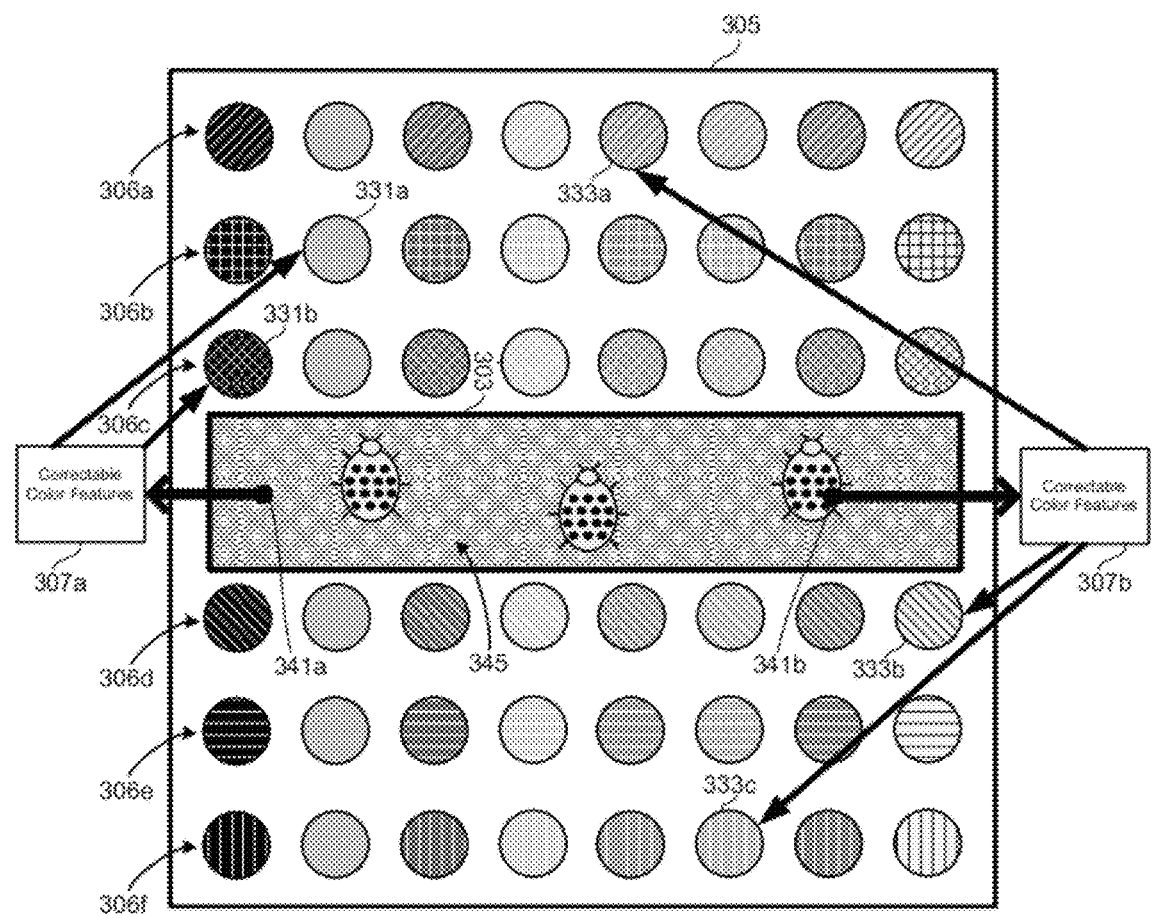
FIG. 3 is a conceptual illustration of an imaged object and dynamic color chart in accordance with an example of the present invention.

Examples of the present invention provide a dynamic color chart system for color correction. More particularly, example embodiments are capable of building in situ color measurement systems for decor recommendations in addition to apparel recommendations based on the extraction of object features and corrected color values. According to one example, a single color chart having known color values are used to color correct the image. Moreover, each feature area of the imaged object may be corrected with color patches on the chart that are sufficiently close in value to the feature color value, which may then be used to generate product recommendations Referring now in more detail to the drawings in which like numerals identify corresponding parts throughout the views, FIGS. 1A-1D are conceptual block diagrams of the dynamic color correction system according to an example of the present invention. As shown here, the system 100 includes an image sensor 108, an image region analyzer 110, a color corrector 112, and a palette selector 114 for generating a customized color palette 120. The image sensor, or imaging sensing device, 108 may be a digital camera, a digital photograph scanner, a video recording device, a web camera, or similar imaging apparatus. The image sensor 108 may image a scene 101, which includes a dynamic reference chart 105 and an object 103 so as to create an uncorrected image 109. Moreover, the dynamic reference chart 105 and object 103 may be positioned anywhere within the scene 101 so as to be captured by the image sensor 108. According to one example embodiment, the uncorrected image 109 is then transmitted via connection 20 to an image region analyzer 110. The image region analyzer 110 is configured to analyze the uncorrected image 109 and determine regions and features of the uncorrected image that may be chosen for color correction. More particularly, a desired area of interest (i.e., color correctable region/area), may be identified from a cut out on the dynamic color chart as shown in FIG. 3, or the desired area of interest may be selected manually by the operating user. For example, the object 103 may have many colors, texture, patterns, or finishes, and image analyzer 110 may identify a particular feature or multiple features of each region and provide the feature(s) 111 to the color corrector 112 for color correction. Still further, each feature includes at least one correctable color value, which is the color intended for correction by the dynamic color correction system. Color corrector 112 may take as an input feature(s) 111 via connection 30 and produce target or corrected color(s) 113 based on a correctable color values found in feature(s) 111 using various correction algorithms. Corrected color(s) 113 may then be input via connection 40 to palette selector 114, which may produce color palette 120, using palette/finish/color database 116, which may be a database or databases of finishes, paints, colors, and/or color coordinated palettes designed by an interior designer or other expert.

As explained above, after scene 101 (including chart 105 and object 103) is captured via image sensor 108 to generate uncorrected image 109, the uncorrected image 109 may be transmitted to image analyzer 110 over a connection 20, and image region analyzer 110 may provide feature(s) 111 to color corrector 112 over a connection 30, which in turn provides corrected color(s) to the palette selector 114 over connection 40. Connections 20, 30, and 40 could be physically close connections, and be wired or wireless, for example, if imager 108, image analyzer 110, color corrector 112, and palette selector 114 are contained within a computer, a PDA, a mobile phone, or printing system, such as a scanner/printer or scanner/copier or other system or device. Alternatively, connections 20, 30, and 40 may be more distant connections, which may include a telephone (e.g., cellular, public switched, etc.) network and/or a computer network, such as a LAN (local area network), a WAN (wide area network), or the Internet. Connections 20-40 could also include a file transfer system, such as a portable file system such as a CD, DVD, or thumb or flash drive, which contains uncorrected image 109 or feature(s) 111 which is then input to image analyzer 110 or color corrector 112.

Image sensor 108 may analyze uncorrected image 109 and determine different features of the uncorrected image 109 that may be selected for color correction. For example, an object 103 may have many colors, textures, patterns, or finishes, and image region analyzer 110 may identify one or more features and provide correctable color values associated therewith to the color corrector 112 for color correction and then to palette selector 114 for palette selection. That is, textiles may have a weaving pattern and varying colors, mosaics could have different colors or finishes, and paintings or tapestries may have different colors, textures, or patterns. Image region analyzer 110 may offer the user the chance to select one or more regions and features to match, such as by identifying a feature with a box that the user can select. An example could be a tapestry having a texture, a pattern, and a background color and showing different scenes using different colors, and image region analyzer 110 may identify areas/colors for matching the texture, the pattern, the background color, and/or colors from different scenes. In another example, a flower could be depicted in a textile or fabric, and image region analyzer 110 could identify the color or texture of the stem, petal, or center for matching. The scale of which to consider a pattern could also be identified by image region analyzer 110. The scale definition may allow the pattern to be pulled out or blended. Depending on the interior design application the pattern may "read" as a specific figure or it can "read" as a blended figure with the color values of the pattern mixed together. In a further example, image region analyzer 110 could identify all the colors within uncorrected image 109 and prepare a histogram, from which the user may select which colors to be matched.

Color palette 120 can be a multitude of paint colors or textiles, etc. It may be produced by a décor or apparel expert and may be updated seasonally and/or annually as in the fashion industry. In one example, a color palette 120 can be a set of colors, $p_k = \{c_1, c_2, c_3, \ldots, c_K\}$ selected for their balanced and pleasing combination. Namely and according to one example embodiment, a customized color palette 120 represents a set of coordinated colors that form an aesthetic collection. Palettes may also include primary and secondary color harmonies. If $c_s$ is, for example, the sample color from palette/finish/color database 116, the palette pi may be found based on the minimum [color difference ($c_s$, $c_j$, for all j in the palette colors)] over the set of all given palettes. This method may find a number of potentially good palettes for the target consumer. Moreover, palette/finish/color database 116 may consist of palettes of two, four, six, or any arbitrary number of colors desired by consumer. According to one example embodiment, when the color $c_s$ of the object or feature(s) is determined, that color is found among the color palettes, and the palette containing that determined color is output as color palette 120.

In one example, the color palette 120 may be determined by the colors associated with multiple features of an object or objects. Multiple regions and features of an image can be analyzed and a customized palette 120 may incorporate one or more of the colors of these features. That is, correction of multiple features and subsets are possible using the system and method in accordance with examples of the present invention. For example, a vase containing flowers may have multiple objects and colors that are used to determine the palette of interest that combines these. Or perhaps a shirt and pants may be used to determine the color palette for a matching tie. Conversely, using a tie having multiple colors (e.g., three), an embodiment of the invention may determine a palette of interest for what other items (shirt and pants) to wear with the tie that will combine these three colors.

With reference now to the example embodiment of FIG. 1B, a dynamic matching system 200 is depicted in the event a user desires to accurately match the color of a particular object 103, in which case image region analyzer 110 may be omitted and the uncorrected image 109 is input directly to color corrector 112 for matching the average color of object 103. Additionally, a tolerance testing module 118 may receive the corrected color 113 from the color corrector 112 and determine a match level between the corrected color 113 and desired color of the object 103. Tolerance testing module 118 may return match information 125 such as a pass or fail notification regarding the results of the match determination (e.g., pass for a match level within a predetermined tolerance value or a fail for a match level outside the tolerance value), a confidence interval result that indicates the reliability of the match level of the corrected color and the desired color of the object, or an error metric/difference measurement, which may be the actual +/− difference in color value between the corrected color and the desired color.

Turning now to the example embodiment depicted in FIG. 1C, a dynamic training system 300 may be utilized in which the color patches used for color calibration are a sub-set of all the chart colors. Similar to the example of FIG. 1A, an image sensor captures the scene 101 of object 103 and reference chart 105 so as to produce an uncorrected image 109. In turn, the image region analyzer 110 analyzes regions of the uncorrected image and selects (automatically or manually from a user) feature(s) 111, which are transmitted to chart analyzer 117. In accordance with example embodiment, the chart analyzer 117 produces sampled charts 115 based on the indentified features 111 for transmission to the dynamic training module 123, which utilizes the sampled or chart subset 115 rather than a particular color for color calibration. A subset of color patches 119 may then be sent to palette selector 114 for producing an appropriate color palette 120 using palette/finish/color database 116 as in the previous examples.

FIG. 1D depicts a chart analyzing system for successive or iterative refinement of charts starting from coarse sampling to finer sampling. For example, the system 400 may be configured to sample from various disparate colors to just blue color values. More particularly, image sensor 108 captures the scene 101 of object 103 and reference chart 105 so as to produce an uncorrected image 109 for processing and analysis by the image region analyzer 110. Based on the analyzed regions of the uncorrected image, features 111 are selected and are transmitted to chart analyzer 117 as in the previous example. Chart analyzer 117 receives the identified features so as produce sampled charts for transmission to the chart selection module 122. Thereafter, the chart selection module 122 creates a finely sampled chart subset 124 that is fed back and used as the dynamic reference chart 105, which may then be processed successively by the chart analyzing system 400 for further refinement. Tolerance control 126 may be used to protect the computing system by ensuring that the chart analyzing system does not establish an infinite loop situation without any terminating condition. For example, the tolerance control 126 may be set to terminate the loop after five successive iterations.

The parts and blocks shown in FIGS. 1A-1D are examples of parts that may comprise system 100, dynamic matching apparatus 200, dynamic training apparatus 300, and chart selection apparatus 400 and do not limit the parts or modules that may be part of or connected to or associated with system 100 and apparatuses 200-400. For example, although image sensor 108, image analyzer 110, color corrector 112, and palette selector 114 are shown within box 100-400, one or more of these blocks may reside in different physical "boxes" or devices, and the connection(s) between them, e.g., connections 20, 30, and 40 may be wired or wireless, via physically close connections or over a network, or via a file transfer system, as described above with respect to connections 20-40. Thus, image analyzer 108, image region analyzer 110, color corrector 112, and palette selector 114 could be in one "box" and image sensor 108 may be separate, or image sensor 108 and image analyzer 110 could be in one "box," or image sensor 108, image analyzer 110, and color corrector 112 could be in one "box" and palette selector 114 may be separate, or all four blocks could be in separate physical "boxes."

FIG. 2 is a conceptual illustration of the dynamic color chart according to an example of the present invention. As shown here, a dynamic color chart 205 includes groups of color patches 206a-206f and a cutout area 230 in a central region thereof for insertion of an object of interest. In the present example, the groups of color patches 206a-206f are organized in rows with each row being centered around a disparate and general hue, such as blue, red, green, etc., so as to substantially cover an entire color spectrum. The color patches in the dynamic reference chart 205 may come from secondary hues related to the general hue of the chart and distributed to cover a good range of chroma and lightness. In one example, the patches may also be specific colors extracted from a database, such as palette/finish/color database 116 of FIG. 1A. Since hue is the most natural attribute of color, the rows of color patches 206a-206f may be ordered by similar hues to facilitate their use. Moreover, the single dynamic chart 205 may include a number of color patches that are strategically chosen to cover the entire color spectrum. As a result, examples of the present invention help to eliminate the effort and color-knowledge required by users in choosing from among different charts as in prior solutions. There are many configurations possible for dynamic reference chart 205 other than six rows of color patches surrounding a rectangular cut-out. For instance, the shape does not have to be rectangular and the cut out object area 230 is simply to define a region of the sample. This can be in any region, however, but should be identifiable by a computer vision area selection algorithm. Also, the chart shape, cut-out shape, and surrounding color arrangement may vary according to the artwork and style of the brand for example.

Color selection may work in two or more steps. For example, the dynamic color chart 205 will appear to have a range of colors and the color range may be refined based on distance values from the target colors. In a first step, the chart 205 includes coarse color values and the system makes the best approximation match to the sample color. That is, the system is configured to minimize the color difference from the sample color to the coarse color values. The least different point from the sample color is used for selecting the corresponding sample row amongst the plurality of rows 206a-206f in the dynamic color chart 205. This row will then be used in the second step for computing a color correction matrix as will be explained in more detail with reference to FIGS. 4A-4B.

Additionally, the light-dark ramp bar 242 may be used for white balance processing techniques or to derive a capture-specific tone curve for the image during post-processing. The light-dark ramp 242 may also be used to provide a metric of how close of a lightness match between the captured color and corrected color is provided by the system. For example, the closest tone value in the input can be compared to a matched color value to estimate the difference, in which case the system can notify the user if the difference is too large.

FIG. 3 is a conceptual illustration of an imaged object 303 and dynamic color chart 305 in accordance with an example of the present invention. As shown here, a single dynamic reference chart 305 is photographed with the sample décor object 303. Regions 341a and 341b of the imaged object 305 may defined by the image region analyzer as discussed above, and correctable color features 307a and 307b may be extracted from the imaged object 303. According to one example embodiment, an appropriate coarse color is selected amongst the row of colors 306a-306f for each extracted feature of the imaged object 303. In the present example, there are two different regions 341a, 341b of the material 345 that are extracted for color correction. Here, the background color region 341a, which may be a yellow-beige and brownish color for example, will cause the system to select color patches (e.g., coarse colors 331a and 331b) from the chart 305 that relate to the yellow-beige and brown color tones. The "lady bug" region 341b of the imaged object 303, which may have a red color for example, will cause the system to select color values in the color correction chart within a red color range (e.g., coarse colors 333a, 333b, and 333c).

Figure 4A:
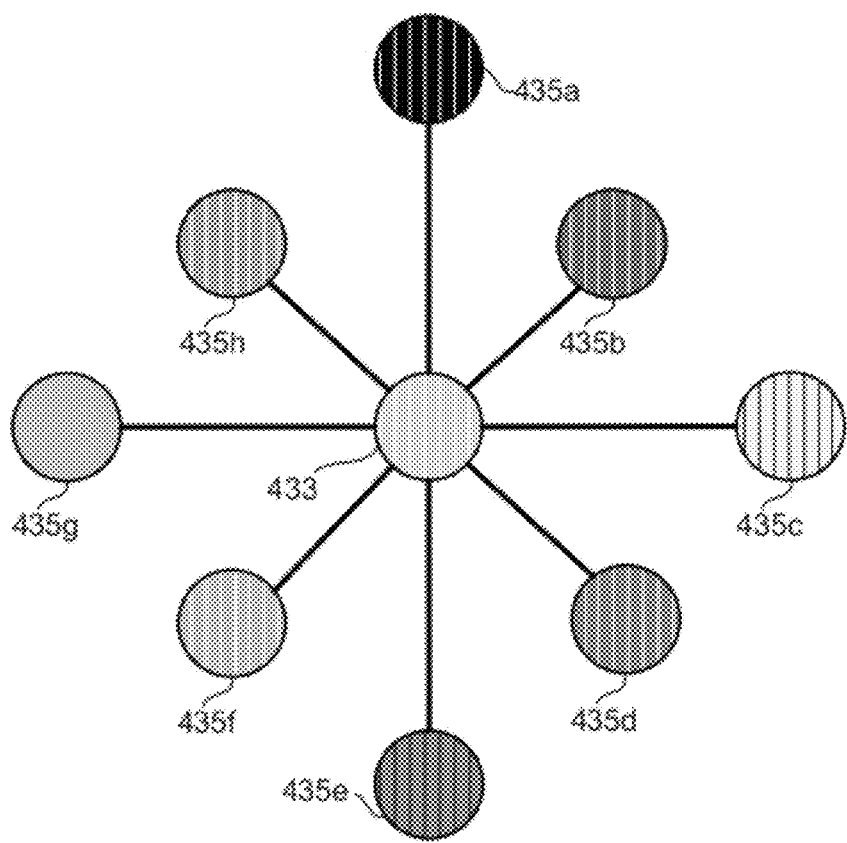
FIGS. 4A and 4B are graphical illustrations of computational methods for dynamic color correction according to an example of the present invention.
Figure 4B:
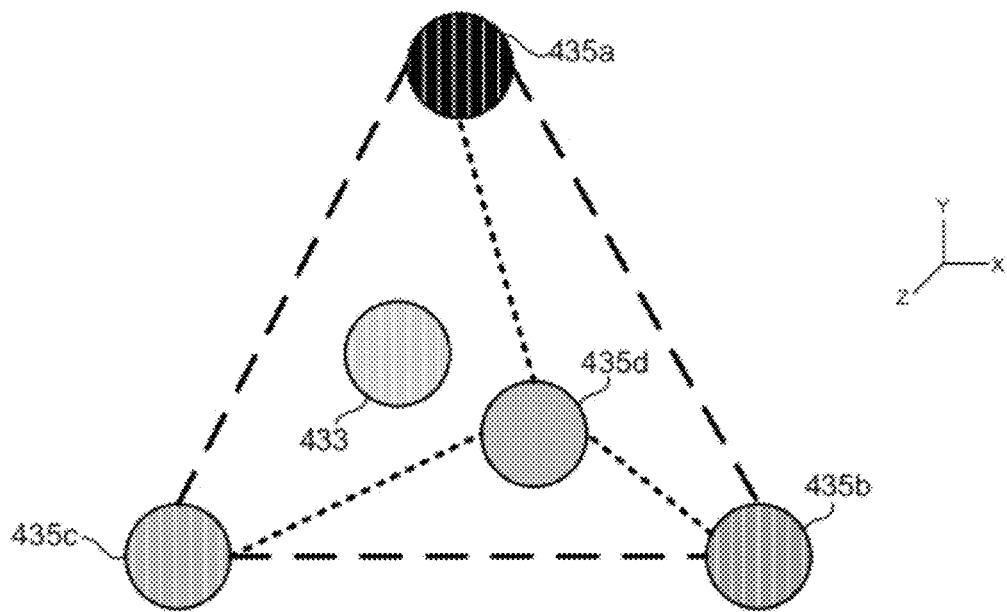

FIGS. 4A and 4B are graphical illustrations of computational methods for dynamic color correction according to an example embodiment of the present invention. Various computational techniques may be utilized for calculating a color match. For example, the best matching color value may be determined from all the color values in the dynamic reference chart. Thereafter, a correction matrix is constructed from the set of points in the dynamic reference chart so as to form a matrix of size K. This matrix may then be used to color correct the feature or sample color. Moreover, each color within the chart may include a set of nearby colors which are used to form chart values dynamically. In the present example, the first color match 433 and the secondary matches 435a-435h are shown as radial color values. According to one example, the closest radial color values of the secondary matches 435a-435h are then compiled into a list for color correction.

In the example embodiment shown in FIG. 4B, a tetrahedral interpolation technique is depicted. Here, color values 435a-435d connected with dotted lines represent nodes, or corners of the tetrahedron, while the unconnected color value 433 represents the captured color. The corresponding node colors 435a-435d of the tetrahedron can be interpolated in order to calculate a corresponding color of the captured color 433. Moreover, in the event that the captured color falls within multiple tetrahedrons given a selection of neighboring points, it is possible to use an inverse volume weighted average of the interpolated color values. This method makes use of a 'mondo' target, as well as the coarse and fine navigation steps of the colored patches, thereby creating a numerical method of multi-dimensional interpolation. For example, given a set of nearby color patches, the system may determine if a captured point falls within a simplex or tetrahedron formed by any four colors. According to one example, the following formula may be used to test whether a captured color falls within a given tetrahedron:

$$\begin{bmatrix} \alpha \\ \beta \\ \gamma \end{bmatrix} = \begin{bmatrix} x_1 - x_0 & x_2 - x_0 & x_3 - x_0 \\ y_1 - y_0 & y_2 - y_0 & y_3 - y_0 \\ z_1 - z_0 & z_2 - z_0 & z_3 - z_0 \end{bmatrix}^{-1} \cdot \begin{bmatrix} X - x_0 \\ Y - y_0 \\ Z - z_0 \end{bmatrix}$$

Where $\alpha+\beta+\gamma<=1$ and $\alpha>=0$, $\beta>=0$ and $\gamma>=0$ if the captured color falls within the tetrahedron. Once a tetrahedron is located, the interpolated value may be computed as follows:

$$\begin{bmatrix} A_i \\ B_i \\ C_i \end{bmatrix} = \begin{bmatrix} a_1 - a_0 & a_2 - a_0 & a_3 - a_0 \\ b_1 - b_0 & b_2 - b_0 & b_3 - b_0 \\ c_1 - c_0 & c_2 - c_0 & c_3 - c_0 \end{bmatrix} \cdot$$

$$\begin{bmatrix} x_1 - x_0 & x_2 - x_0 & x_3 - x_0 \\ y_1 - y_0 & y_2 - y_0 & y_3 - y_0 \\ z_1 - z_0 & z_2 - z_0 & z_3 - z_0 \end{bmatrix}^{-1} \cdot \begin{bmatrix} X - x_0 \\ Y - y_0 \\ Z - z_0 \end{bmatrix} + \begin{bmatrix} A_0 \\ B_0 \\ C_0 \end{bmatrix}$$

However, this computational method is one example, and many other interpolation techniques may be used for as will be appreciated by one skilled in the art.

Alternatively, the correction matrix may be constructed dynamically. More specifically, a first calibration pass may be used to select the neighborhood center point and then sample points are selected from the rest of the chart, which will serve to form a well distributed list of neighborhood color values. The list of neighbors color values for each chart sample may then be computed and stored for reference during color correction. The first calibration pass will then search for a chart sample closest to the object color and the nearest neighbors for that sample may then be used for the color correction matrix. The number of identified neighbors, K, may be selected by the system to optimize correction performance. However, the number of identified neighbors may be extended to include neighbors from more than one nearby chart color (i.e., include neighbors from the three closest chart colors). Alternatively, the color difference (dE) between each sample may be computed along with other samples on the chart. The color difference values may be sorted to create a list of the K neighbors with the smallest dE values. Still further, the system may be configured to use only neighbors within a specific dE range. In such an example, the number of neighbors would, vary for each sample depending on how many patches are within the target dE range.

FIGS. 5A and 5B are simplified flow charts of the processing steps for dynamic color correction according to an example of the present invention. In step 502, the system receives a captured image or scene of an object of interest and a dynamic reference chart. For instance, the received image may arrive over network-connected digital camera or digital photograph scanner for example. Next, in step 504, the system identifies regions and correctable color features/colors from the imaged object as outlined above. A target color value substantially corresponding to correctable color values is identified by the processor in step 506. According to one example, the correctable color value of the feature and imaged object is then corrected in step 508 based on the identified target value. Thereafter, in step 510, the corrected color(s) may be processed by the system in order select and produce an appropriate color palette to the operating user.

FIG. 5B depicts a simplified flow chart of the processing steps for the dynamic matching apparatus. In step 512, a desired object or color value is received by the dynamic color correction system. A target color value substantially corresponding to desired color values is then identified by the processor in step 516. The system is configured to compute a match level between the corrected color and desired color of the object in step 518. Next, in step 520, the system presents to the user for example, match information such as a pass or fail notification regarding the results of the match determination, a confidence interval result that indicates the reliability of the match level of the corrected color and the desired color of the object, or an error metric/difference measurement, which may be the actual difference in color value between the corrected color and the desired color.

In summation, the system of method described in present invention aids in providing an improved and efficient dynamic color correction system. Furthermore, many advantages are afforded by the color correction method in accordance with examples of the present invention. Numerous images, particularly those concerning textiles, have multiple color regions and providing single dynamic reference chart helps to simplify the color correction process as a single image may be captured with one reference chart and yet give many corrections for each region. Moreover, when compared to previous chart-based correction system, examples of the present invention have shown significant improvement in with respect to the selection of accurate color values. Still further, the dynamic color correction system of the present example may cover an entire range and spectrum of colors rather than just skin tones or home décor material so as to be applicable to interior and exterior decoration, fashion, apparel, and other applications.

Aspects of the present invention may be embodied in the form of a system, a method, or a computer program product. Similarly, aspects of the present invention may be embodied as hardware, software or a combination of both. For example, aspects of the present invention such as the "boxes" of system and apparatuses 100-400 may be embodied as a computer program product saved on one or more non-transitory computer readable media in the form of computer readable program code embodied thereon.

For example, the non-transitory computer-readable medium may be a computer-readable storage medium. A computer-readable storage medium may be, for example, an electronic, optical, magnetic, electromagnetic, infrared, or semiconductor system, apparatus, or device, or any combination thereof. Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

Furthermore, while the invention has been described with respect to exemplary embodiments, one skilled in the art will recognize that numerous modifications are possible. Thus, although the invention has been described with respect to exemplary embodiments, it will be appreciated that the invention is intended to cover all modifications and equivalents within the scope of the following claims.

What is claimed is:

1. A method for dynamic color correction, the method comprising:
   receiving an image containing an object and a color chart, wherein the color chart includes a range of color values arranged in respective groups centered around a disparate and general hue and covering an entire color spectrum;
   determining at least one feature and an associated correctable color value from the received image;
   identifying, from the range of color values in the color chart, a target color value that corresponds to the correctable color value, wherein the target color value comprises the color value in the color chart having a minimized difference value to the correctable color value;
   constructing a color correction matrix using sample color values that neighbor the identified target color value on the color chart; and
   correcting the correctable color value based on the identified target color value using the color correction matrix.

2. The method of claim 1, further comprising:
   generating a color palette based on the target color value.

3. The method of claim 1, wherein correcting the color value further comprises:
   receiving a desired color value;
   computing a match level between the desired color value and the target color value; and
   notifying a user of match information related to the match level between the correctable color value and the target color value.

4. The method of claim 1, wherein the color chart is a single color chart comprising of a plurality of disparate and similar hue colors.

5. The method of claim 1, wherein the at least one feature represents a sub-area of the object.

6. The method of claim 1, wherein the object includes a plurality of features for correction.

7. A color correction system, the system comprising:
   a processor; and
   a memory on which is stored machine readable instructions to cause the processor to:
   receive at least one feature from an image of an object and a color chart that includes a range of color values arranged in respective groups centered around a disparate and general hue and covering an entire color spectrum, and
   identify a target color value from the range of color values in the color chart that corresponds to a correctable color value, wherein the target color value comprises the color value in the color chart having a minimized difference value to the correctable color value;
   construct a color correction matrix using sample color values that neighbor the identified target color value on the color chart; and
   correct the correctable color value based on the identified target color value using the color correction matrix.

8. The color correction system of claim 7, wherein the machine readable instructions are further to cause the processor to:
   generate a color palette based on the target color value.

9. The color correction system of claim 7, wherein the machine readable instructions are further to cause the processor to:
   receive a desired feature or color value;
   compute a match level between the desired color value and the target color value; and
   notify a user of match information related to the match level between the desired color value and the target color value.

10. The color correction system of claim 7, wherein the color chart is a single color chart comprising of a plurality of disparate and similar hue colors.

11. The color correction system of claim 7, wherein the at least one feature represents a sub-area of the object.

12. The color correction system of claim 7, wherein the object includes a plurality of features for correction.

13. The color correction system of claim 7, wherein the machine readable instructions are to cause the processor to receive the image of the object and color chart over a network.

14. The color correction system of claim 7, wherein the system resides as at least part of a mobile phone.

15. A non-transitory computer readable storage medium having stored executable instructions, that when executed by a processor, causes the processor to:
   receive an image of an object and a dynamic color chart, wherein the dynamic color chart includes a range of color values;
   determine at least one feature and an associated correctable color value from the received image arranged in respective groups centered around a disparate and general hue and covering an entire color spectrum;
   identify, from the range of color values in the color chart, at least one target color value that corresponds to the correctable color value, wherein the target color value comprises the color value in the color chart having a minimized difference value to the correctable color value;
   construct a color correction matrix using sample color values that neighbor the identified target color value on the color chart; and
   correct the correctable color value based on the identified target color value using the color correction matrix.

16. The non-transitory computer readable storage medium of claim 15, wherein the executable instructions further cause the processor to:
   generate a color palette based on the target color value.

17. The non-transitory computer readable storage medium of claim 15, wherein the executable instructions further cause the processor to:
   receive a desired feature or color value;
   compute a match level between the desired color value and the target color value; and
   notify a user of match information related to the match level between the desired color value and the target color value.

* * * * *